United States Patent [19] [11] 4,176,892
Wright et al. [45] Dec. 4, 1979

[54] METHOD FOR PRODUCING LASER PLASMA TUBE AND PRODUCT

[75] Inventors: Dave L. Wright, Palo Alto; Felix J. Schuda, Mountain View; Joseph J. Spranza, III, Woodside, all of Calif.

[73] Assignee: Spectra-Physics, Inc., Mountain View, Calif.

[21] Appl. No.: 788,513

[22] Filed: Apr. 18, 1977

Related U.S. Application Data

[62] Division of Ser. No. 689,039, May 24, 1976.

[51] Int. Cl.$^2$ .............................................. H01J 9/18
[52] U.S. Cl. ..................................... 316/19; 29/25.16; 316/26
[58] Field of Search .................. 316/19, 26; 29/25.14, 29/25.15, 25.16; 331/94.5 D, 94.5 C

[56] References Cited

U.S. PATENT DOCUMENTS

| 3,251,641 | 5/1966 | Gaylord | 316/19 X |
| 3,764,934 | 10/1973 | Schamberger | 331/94.5 D |
| 3,883,820 | 5/1975 | Burns et al. | 331/94.5 C |
| 3,916,337 | 10/1975 | Kindl et al. | 331/94.5 D |

Primary Examiner—Richard B. Lazarus
Attorney, Agent, or Firm—Flehr, Hohback, Test, Albritton & Herbert

[57] ABSTRACT

A method and resulting laser tube apparatus constructed from a plurality of components adapted to be arranged in axial alignment and self supporting with respect to each other. The elements are adapted to withstand high baking temperatures and are provided at their mating surfaces with material capable of forming a flowable seal between the components during baking and subsequently solidifying to a hermetic seal upon cooling. End adjustment mirror mountings which combine adjustable functions together with desirable electrical properties are also disclosed, together with procedures for obtaining optical alignment of the resultant tube product.

11 Claims, 9 Drawing Figures

METHOD FOR PRODUCING LASER PLASMA TUBE AND PRODUCT

This is a division of application Ser. No. 689,039 filed May 24, 1976.

CROSS REFERENCE TO RELATED APPLICATIONS

Cross reference is made to U.S. Pat. application Ser. No. 548,034, filed Feb. 7, 1975, now abandoned, entitled PLASMA TUBE AND METHOD OF MANUFACTURE, in the names of Dale E. Crane et al., and assigned to the same assignee, hereinafter referred to as the Crane et al. application.

BACKGROUND OF THE INVENTION

The present invention relates to a method and apparatus for producing hermetic, hard-sealed plasma tubes for gas laser applications, and to a novel plasma tube product the mirror mountings of which can be adjusted after assembly and baking. More particularly, the invention relates to a technique for producing such hard-seal plasma tubes by a baking process which can be carried out in a single step or small number of steps to produce a hard-sealed plasma tube. As used herein, the term "hard-sealed" will refer to hermetic, high temperature vacuum tight seals such as glass-to-metal seals, ceramic-to-metal seals, and brazed metal seals utilizable in the present invention.

The referenced application discloses a technique for manufacturing laser plasma tubes in which various combinations of matching metals and glasses are provided so that it is possible by a multiple step process to make up a laser plasma tube having hard seals or optionally having epoxy seals for attaching the end mirrors in place. It is highly desirable to construct laser plasma tubes in which all seals are glass-to-metal thereby permitting high temperature vacuum processing and also eliminating problems caused by the permeability of epoxy type seals to water vapor; which although quite low, limits laser plamsa tube life. However, the previously used techniques, such as are shown in the referenced Crane et al. application, required multistep flame processing and considerable skilled labor. There is, therefore, a need for a new and improved method and apparatus for producing a hard-sealed laser plasma tube.

SUMMARY OF THE INVENTION AND OBJECTS

A general object of the present invention is to provide a method and apparatus for producing hard-sealed plasma tubes for lasers which will overcome the foregoing limitations and disadvantages by providing preassembly of all laser tube parts in a vertically arranged end-on configuration (with respect to gravity) and by baking the same in a single step or small number of steps through an appropriate heating and cooling cycle or cycles.

It is a further object of the invention to provide a method and apparatus together with appropriate procedures for establishing accurate optical cavity alignment of the resulting laser tube product.

It is a further object of the present invention to provide a hard-seal plasma tube for laser application which can be built economically and with a minimum of separate operations.

A more specific object of the present invention is to provide a hard-seal plasma tube which maintains a reasonably accurate alignment of the mirrors throughout the processing cycle.

A further object is to improve the initial accuracy of the tube assembly by using self-centering and self-supporting components.

A further object is to provide a hard-seal plasma tube manufacturing method and apparatus of the above character which provides for fine optical cavity alignment after the vacuum sealing and gas filling of the tube.

In general, the method and apparatus of the present invention call for utilization of a plurality of pre-formed parts which will make up the laser tube product. The parts principally comprise a plasma tube glass envelope, cathode and capillary structures, metal end closures and thermally compatible glass and optical elements such as mirrors; all joined together by interposed glass-to-metal bonds. These parts are assembled in a jig in such a way that they are self-aligning with respect to a single vertical axis and self-supporting when positioned end-on with the axis of the tube being directed upwardly with respect to gravitational force. The assembled tube parts are held in lateral position by the jig with the various parts being aligned correctly by their own constructional features.

The various parts of which the laser tube structure are assembled are selected from materials which have closely matching coefficients of expansion. Reference is made to the aforementioned co-pending Crane et al. application for discussion of materials which will satisfy these requirements. For the sake of completeness of the present application, the following is given as an enumeration of glass, metal, mirror, substrate and sealing materials by way of example of those useful for carrying out the present invention, it being understood that other combinations of matching compounds may be substituted as dictated by cost, ease of manufacture, stability, and other chemical and physical properties of materials.

A preferred material for the plasma tube envelope and for the capillary is a potash soda lead glass with a thermal expansion coefficient of $90 \times 10^{-7}/°$ C., available under the trade designation 0012 from Corning, or its equivalent, Kimbal KG12. A preferred metal for end closures include nickel-chrome-iron alloy (42% nickel, 5–6% chrome, balance iron), with a thermal expansion coefficient of $82 \times 10^{-7}/°$ C. is commercially available under the designation Sealmet HC4 or Carpenter 42-6. The mirror substrates are preferably made from materials compatible with high temperature baking and which have a high annealing temperature such as BK-1, having a thermal expansion coefficient of about $90 \times 10^{-7}/°$ C. Other examples of bakable mirror substrate and coating combinations will be given. Solder glass is used to provide a hard seal which is compatible with the respective metal and glass parts includes SG-68 with a thermal expansion coefficient of approximately $90$–$100 \times 10^{-7}/°$ C. and CV-101 with one of $94 \times 10^{-7}/°$ C., both of which have a melting point 20°–30° C. lower than the above-mentioned potash soda lead glass. As disclosed in the referenced Crane et al. application, many other glasses and combinations of materials are also suitable.

The components which support the mirrors and laser tube components are assembled in the form of a column in a pillar or other type jig and maintained as such during baking and cool down cycles. The various components are assembled as a vertical column built upwards from the cathode end assembly positioned and supported by a support plate at the bottom of the jig. Lateral positioning of the column is supplied by radially directed adjustment means incorporated in the jig which hold the outer glass envelope in vertical registry with the cathode assembly. The anode end assembly on top of the glass envelope is kept in place by weighted guides and constructional features of the several parts. The mirrors, at the extremities of the column, are received in a corresponding recess in the cathode end mirror plate and by jigging on the anode assembly, and form the optical terminations for an internal coaxial bore which extends through the column.

The jig and assembled tube components are exposed to a baking cycle which calls for the gradual elevation of the assembly and parts from ambient to fusion temperatures over a predetermined period of time, after which a return to ambient takes place over a more extended period so as to avoid too rapid a cooling and development of thermally induced stresses in the product. If desired, the product can be maintained at a holding temperature during cool down while the tube is evacuated and filled, or the tube can be filled after cool down, sealed at the appropriate pressures and adjusted for maximum output, as will be described. A particular feature of the present invention calls for one end of the assemblies of the tube to be inelastically deformable so that adjustment of the tube mirror alignment can be made at that end. The other end assembly is constructed with an elastically deformable diaphragm and adjustment mechanism to permit exact, optimum alignment of the mirrors with respect to the bore.

The above and other objects, and features and advantages of the present invention will become apparent from the following description, reference being made to the accompanying drawings of which:

DESCRIPTION OF THE PREFERRED EMBODIMENTS

Figure 1:
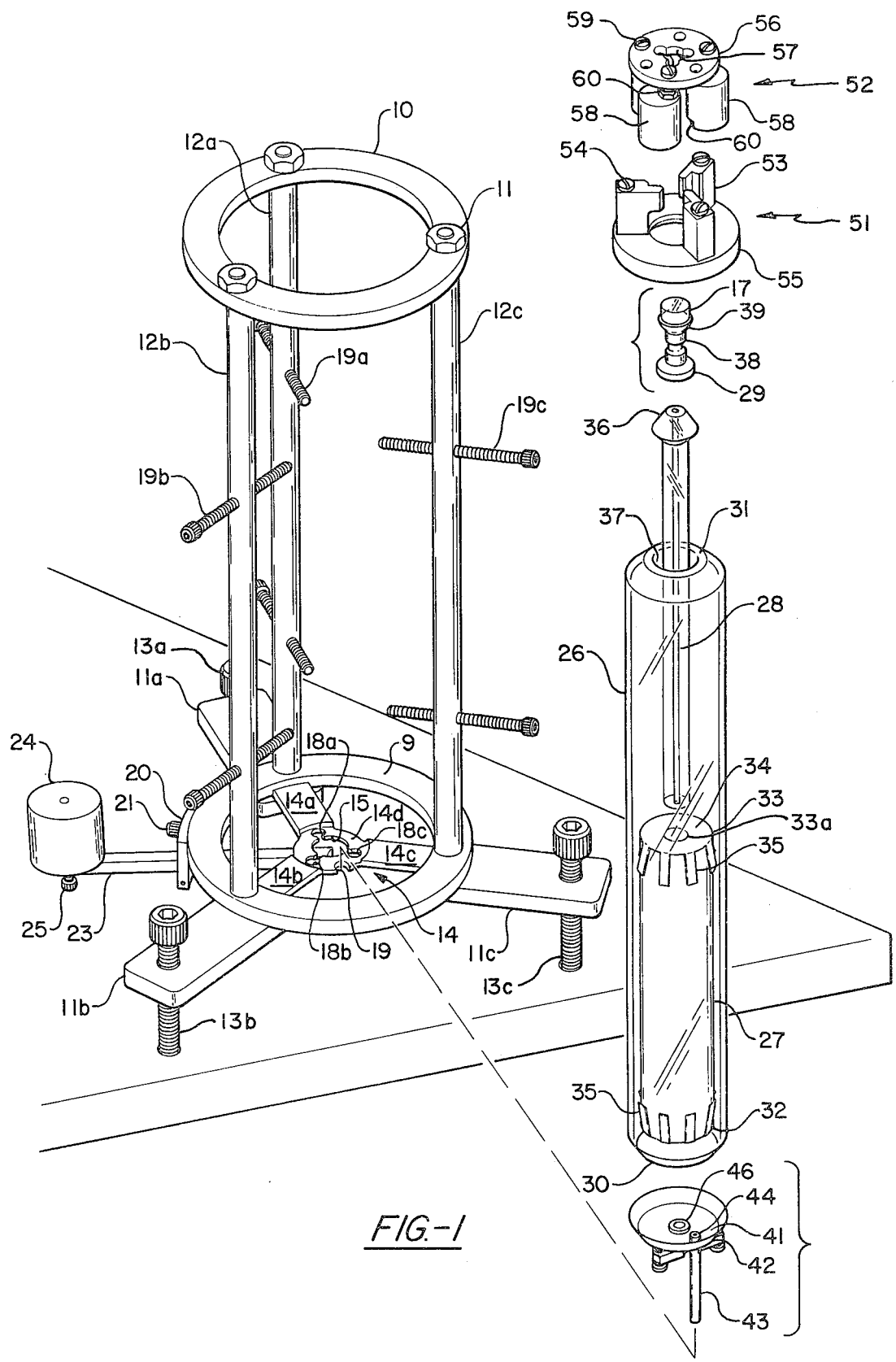
FIG. 1 is a perspective view of an assembly jig and gas laser plasma tube constructed in accordance with the present invention in which the plasma tube assembly is shown with its components in exploded relation and removed from the assembly jig.
Figure 2:
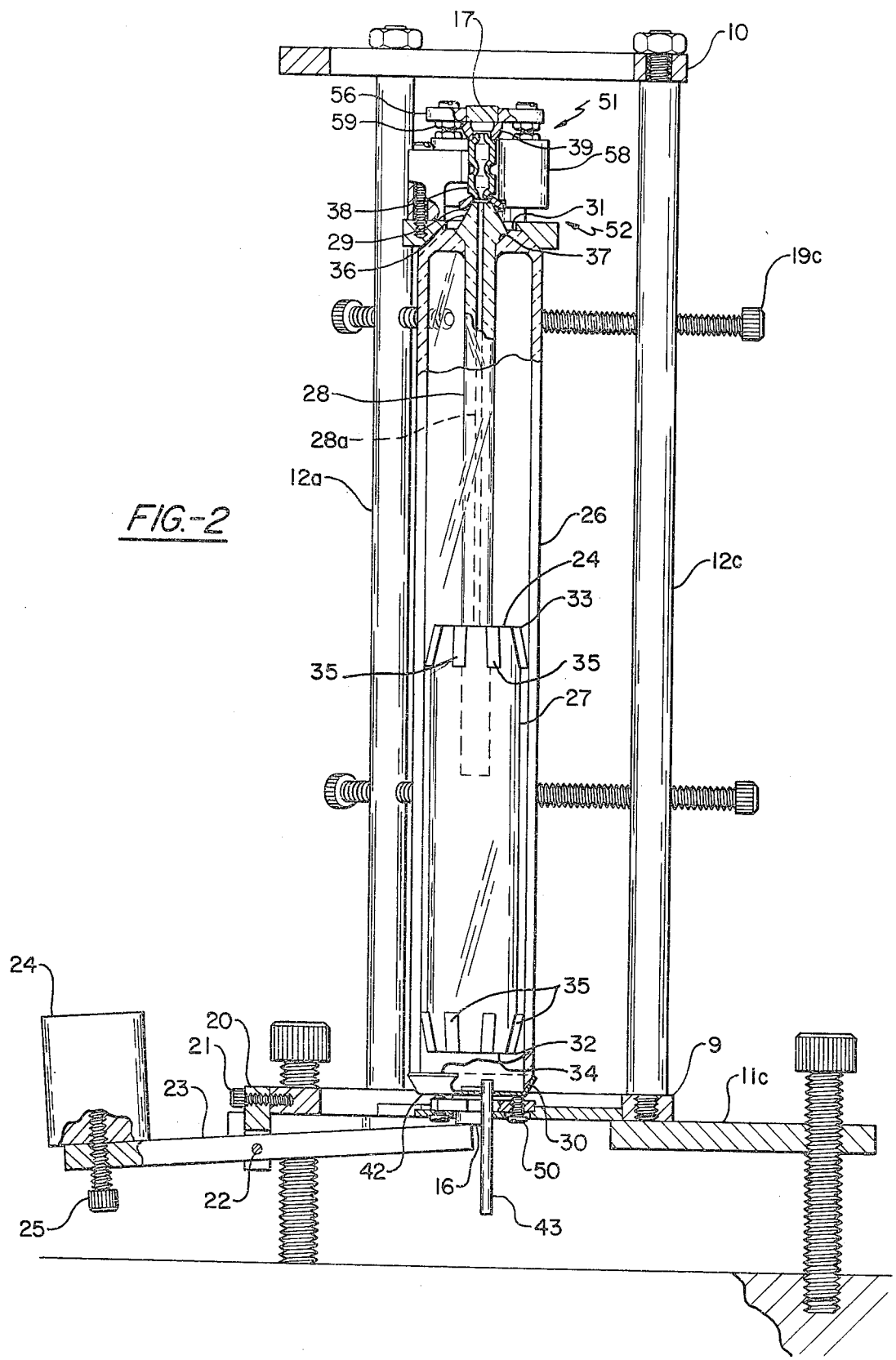
FIG. 2 is a longitudinal view, partly in section, of the assembly jig and tube assembly of FIG. 1, shown assembled and ready for baking.

Referring now to FIGS. 1 and 2 there is shown an assembly jig for constructing and supporting gas laser plasma tube components according to the present invention and includes spaced-apart ring flanges 9, 10, the lower one of which serves as a support base and includes three radially extending bars 11a, 11b, 11c which extend outwardly from a central aperture of the lower ring flange at angles of about 120° with respect to each other to form a tripod support. The bars 11a, 11b, 11c are rigidly attached to the lower ring flange, the upper ring flange being supported in a spaced relation to the lower flange by elongate spacing bars 12a, 12b, 12c. Suitable screw mounts 13a, 13b, 13c are provided in each of the extending bars of the tripod support which may be adjusted to bring the jig assembly into true vertical, thereby providing an adjustable leveling base. Various elements of the laser tube assembly are supported within the assembly jig on a spider flange 14 having three arms 14a, 14b, 14c which extend outwardly and rest upon the inner edges of the support bars 11a, 11b, 11c, respectively. Spider flange 14 is provided with centrally disposed recess 14d for supporting a portion of the laser tube assembly which recess terminates inwardly in an aperture 15 which is large enough to accommodate mirror 16 and also permits application of an independent upward force to mirror 16, as will be described. Mirrors 16, 17 provide an optical cavity through a discharge to be developed in the tube. Three identical apertures 18a, 18b, 18c of lesser diameter and spaced equidistantly around the circumference of aperture 15 and communicate with the latter to provide room for location of cathode mirror adjustment screws to be described. A U-shaped aperture 19 is provided at the circumference of flange 14, intermediate its support by two ends of arms 14b, 14c for permitting passage of a fill tube 43.

A strut 20 is attached by a retaining screw 21 to the outer rim of flange 9 and depends therefrom perpendicularly in a downward direction. A pivot pin 22 at the lower part of strut 20 pivotably supports a lever 23 which extends in a generally radial direction outward from the center of the jig, where it bears toward the underside of flange 14 and, more particularly, against one face of a mirror 16 positioned in the aperture 16. At its end remote from the center, the lever 23 supports a weight 24 which is mounted thereon by a threaded screw 25.

FIG. 2 shows the assembled components of the gas laser plasma tube constructed in accordance with the invention and includes mirrors 16 and 17, respectively, a glass envelope 26, a cathode 27 from which the electrons for excitation of the gas are to be emitted, a capillary tube 28 for definition of the gas discharge and optical path through a bore 28a provided therein, an anode 29, means for sealing of the tube, mounting means for the mirrors 16 and 17, and conductive means at the respective ends of the tube for connecting the cathode 27 and the anode 29 to an external power supply.

The gas envelope 26 of the tube has two open ends 30, 31, respectively, and is of generally cylindrical configuration except at end 31 where it tapers inwardly toward an opening of reduced diameter. The cathode 27 is formed of a section of aluminum tubing and is held in place inside the glass envelope 26 by two conductive cathode supports 32 and 33, confrontingly disposed at each end of the cathode. The cathode supports 32 and 33 have a spider-like outer configuration and include an annular flange 34 from which radially spaced spring clip fingers 35 extend axially and outwardly into contact with the inner wall of envelope 26. The cathode support 32 is seated inside the glass envelope adjacent to the end 30 of the envelope and is connected electrically to a cathode end disc, to be described, by a suitable clip or wire (not shown). Cathode support 33 is formed with an aperture 33a, being shown, surrounded by inwardly directed fingers to serve as support for the capillary 28 after the same is introduced into the envelope through end 31.

While its length is generally narrow and thin-walled, the capillary 28 terminates outwardly of the glass envelope 26 in a bulb 36 which limits its advance into the envelope and also serves to maintain the capillary centered.

End 31 of the glass envelope 26 has a central aperture surrounded by a seat 37 slanted at an angle inwardly to form a conical depression surrounding the aperture and serves as a shoulder for mating closely against an inwardly facing frustro-conical surface portion 36a of bulb 36 at the outer end of the capillary tube 28. The outer portion of bulb 36 is of generally hemispherical configuration and is received in a recess 29a formed by collar 29 of the anode assembly.

Figure 3:
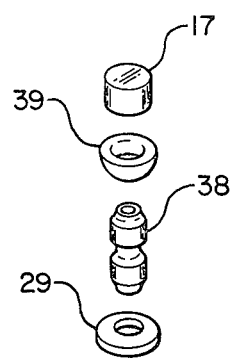
FIG. 3 is an exploded view in perspective of the anode end mirror assembly and the plasma tube of FIG. 1.
Figure 4:
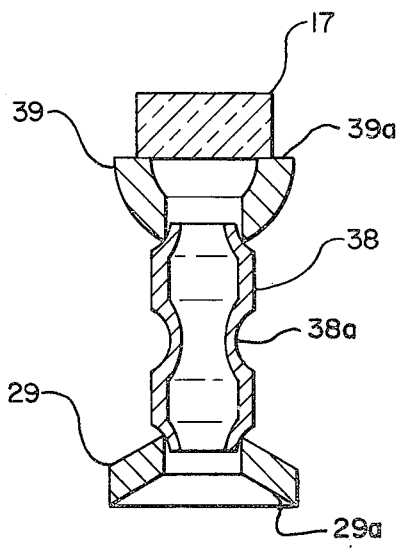
FIG. 4 is a cross-sectional view of the assembled anode end mirror assembly of FIG. 3.

As shown particularly in FIGS. 3 and 4, the anode assembly includes anode collar 29 which is fused as by brazing to a spindle 38 which, in turn, is brazed to a hub 39 on which mirror 17 is mounted. Collar 29 and hub 39 extend generally radially outward of the assembly which spindle 38 extends generally in a longitudinal or axial direction.

In the preferred embodiment, the interior wall of the center portion of the spindle 38 is formed to thinner dimensions than the walls of the wider parts of the spindle in consideration of the bending forces which are to be selectively applied to the center portion during the alignment adjustment of the mirror 17 after the tube has been sealed, as will be described. Spindle 38 is separate from hub 39 and collar 29 so that its forming properties and inelastic characteristics are not restricted to the thermal characteristics of metals that match the mirrors or glass body.

Collar 29 and hub 39 can be made of HC4 Sealmet metal and stamped into the shape shown by conventional means from flat stock. Spindle 38 can be preferably made of stainless steel tubing selected from readily available stock, such as #304, #312, or #320, but could also be made of many other materials including iron 416 stainless steel, etc. The spindle is formed into the shape shown, having a necked down central section 38a, which may be of reduced wall thickness, and may be formed by conventional rolling operations. The collar 29, hub 39, and spindle 28 are joined together to form a unitary structure, as by welding or brazing, and surfaces 39a and 29a are preglazed with glass solder to facilitate attachment of mirror substrate 17 and fusion of the anode mirror assembly to the plasma tube and capillary end 36.

By making the anode assembly in the manner indicated, the reduced portion 38a of reduced wall thickness can be inelastically deformed to bring mirror 17 into alignment with the bore 28a and end mirror 16. During inelastic deformation, the spindle is bent about its longitudinal axis, by means to be described, the strain field thus created propagating outwardly within the center section, but being confined thereto so that stresses are not propagated to the hub 39 or collar 29 where they could promote separation of the mirror substrate or capillary from the anode assembly. It will be noted also that the region of joining the hub and collar to the spindle has a low cross-section which feature further confines stress to the spindle, or to deformation in the regions between the parts. By providing this assembly in three parts, the forming properties and inelastic characteristics of the deformable element 38 can be chosen quite independently of the constraints placed on the members jointed to glass. In practice, the stainless spindle 38 is found to have satisfactory long term stability against creep in that no evidence has been found of degradation of tube performance attributable to such.

Figure 5:
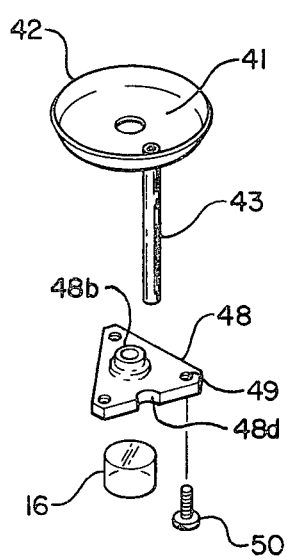
FIG. 5 is an exploded view in perspective of the cathode end mirror assembly of FIG. 1.
Figure 6:
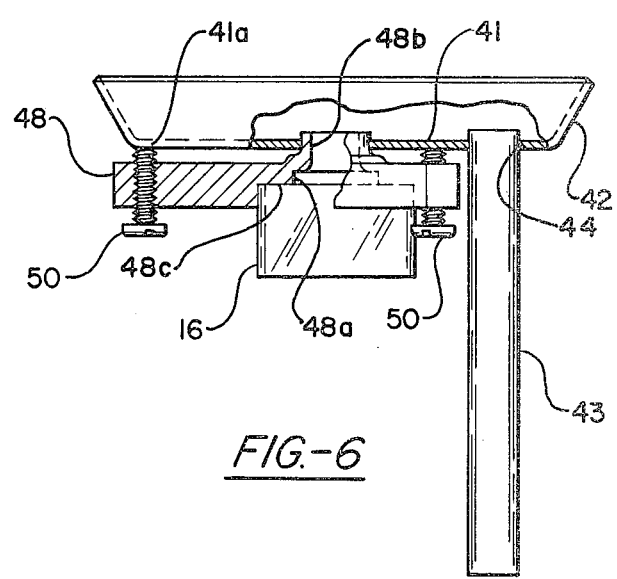
FIG. 6 is an elevational view, partly in cross-section, of the assembled cathode end mirror assembly of FIG. 5.

Referring now to FIGS. 2, 5, and 6, the other end 30 of the glass envelope 26 is fused to a metal cathode end closure and mirror support in the form of a disc 41 forming a central diaphragm surrounded by circumferential rim 42 extending outwardly and radially therefrom at an angle with respect to the plane of the disc. The disc 41 and the rim 42 thereon form a cup which fits closely over the end 30, and an adjoining outer portion of the longitudinal extension of the glass envelope 26. Aperture 46 receives shoulder 48b of plate 48 and further acts as a fenestrum for laser light. A conductor (not shown) is fused between the cathode support 32 and disc 41 to establish an electrically conductive connection therefor through the disc to an external power supply. An adjustment plate 48 is attached in spaced relation to the central portion of the diaphragm disc 41 to form an elastically adjustable mirror support as well as an hermetic termination for that end of the tube.

Thus, adjustment plate 48 is provided with a central aperture 48a surrounded by an axially extending cylindrical shoulder 48b which is fused as by brazing to the disc 41 such that apertures 46 and 48a are aligned, the plate 48 being thereby maintained in spaced parallel position with respect to the plane of disc 41. The shape of the adjustment plate is that of a triangle inscribed in the circle formed by disc 41. At each apex of the triangle an internally treaded bore 49 admits an adjustment screw 50 to be advanced therethrough to bear against rim 41a of the disc 41 at its juncture of rigid support at the edge of envelope 26. On account of the thickness of the disc 41 relative to the plate 48, the former is thereaby angularly movable as an elastically deformable diaphragm with respect to the axis of the tube.

A small diameter piece of metal tubing 43 is fused, as by brazing, into an aperture formed in the disc 41 to permit evacuation and gaseous filling of the plasma tube during or after baking. The periphery of the adjustment plate 48 has an opening 48d for admitting passage of tubing 43 which extends therethrough outwardly from disc 41.

After disc 41, tubing 43, and plate 48 are pre-assembled, the tube facing side of rim 42 as well as mirror receiving recess 48c in plate 48 are preglazed with solder glass or frit.

Referring now to FIG. 2, together with FIG. 1, there is shown the assembled plasma tube constructed as a vertical column in the assembly jig and in compression under two weight members 51 and 52, respectively to be placed on top thereof. Weight member 51 includes three identical, equidistantly spaced projections 53, mounted by machine screws 54 on an annular flange 55, normal thereto, and in a generally radial direction. The projections 53 have an L-shaped cross-section, both in the transverse and in the longitudinal direction.

The flange 55 includes an internal recess shaped to fit over and abut against the upwardly tapered end 31 of the glass envelope 26 as illustrated. When the weight member 51 is placed in position over the respective end of the envelope 26, the forward portions of the projections 53, converging toward the center, are in tangential contact with the wider portions of the spindle 38 to maintain the same in good vertical alignment and centered, since it rests on shoulder surface 37.

Weighting member 52 consists of a disc 56 which includes central aperture configuration 57 similar to that of spider 14 at the lower part of the jig and from which three identical cylindrical weights 58 are suspended by screws 59. The aperture 57 in disc 56 includes centering means for lateral positioning of mirror 17 and weights 58 are provided with relieved portions 60 adapted to align laterally with member 51.

The method of assembling the tube in the assembly jig, as shown in FIGS. 1 and 2, is preceded by a number of steps in which individual tube components are preformed, joined by brazing into subassemblies, and coated with preglazing material on surfaces to be joined by hard sealing. More particularly, the preliminary steps include forming the glass components from glass of suitable characteristics and predetermined coefficients of thermal expansion, stamping or otherwise preparing the metal parts from metal having a coefficient of expansion compatible with that of the selected glass, and coating the mirror substrates, also selected from the point of view of compatible thermal expansion coefficients, with multilayers of the appropriate material. In practice, reflective coating formed of $TiO_2$ and $SiO_2$ layers used on mirror substrates of BK-1 have been found suitable for the hard-seal techniques disclosed herein.

Coatings of preglaze material, selected from frits or solder-sealing glass having a thermal expansion coefficient matching those of the glass and metal parts to be sealed, are applied to the annular recesses provided respectively at the outer surface of the adjustment plate 48 and of the hub 39 which form seats for the mirrors 16 and 17; at the shoulder 37 of the glass envelope and at the portion of the bulb 36 which fits against the shoulder, and to the outer portion of the hemispherical surface on top of bulb 36, as well as to the internal surface of the anode collar 29 receiving the respective surface of the bulb 36 therein.

The cathode end assembly, including parts 41, 43, and 48, together with the glass envelope 26 are put on top of the spider 14 and centered thereon, and mirror 16 is positioned within the recess formed by the central aperture of the adjustment plate 48 where it is held in position by the upward pressure excited by lever 23.

The capillary 28 is then introduced into the glass envelope 26 through its end 31 and stabilized therein by positioning its cantilevered end in the central opening of the support member 33. The anode assembly, comprising the anode collar 29, the spindle 38 and the hub 39, is placed on top of the capillary bulb 36 where it is centered on and supported by shoulder 37 of the glass envelope 26. The mirror 17 is placed on hub 39 and weight members 51 and 52 are put in place over the anode assembly and on mirror 17, as shown.

The combined effects of gravity and of the members 51 and 52 provide a downward acting force on the vertical column formed by the self-centering and self-supporting plasma tube components, all of which is supported at the lower end by spider 14 and held in vertical alignment by the adjusting screws 19a, 19b, 19c of the jig. Maintained in this position, the jigged assembly is baked for a period of 45 minutes, to a temperature which is gradually increased from ambient to 480° C. and then reduced, over a period of two hours, to ambient. In the course of this period, the solder-sealing glass frit applied to the respective surfaces is liquified and hardened into hermetic vacuum seals between mirrors, the anode and cathode assemblies, and the tube envelope, thereby yielding a hard-sealed laser plasma tube. The end mirrors or optical elements are chosen with consideration toward obtaining materials which are not only thermally compatible with the adjoining metal parts to which they are attached, but also with respect to the compatibility of substrate and coating materials to withstand the baking temperatures involved. The following materials are relatively well-matched for this purpose and are believed to be satisfactory. As is common, the first element given is that of the first layer of coating, alternate layers usually consisting of the same or similar material and silicon dioxide:

1. Coating: Aluminum Oxide ($Al_2O_3$)
   Substrate: BK-1 or BALF-1 (Barium Light Flint)
2. Coating: Magnexium Oxide (MgO)
   Substrate: $TiF_3$ (Titanium flint glass) or FK-6 (flint glass)
3. Coating: Titania ($TiO_2$)
   Substrate: BK-1
4. Coating: Thoria ($ThO_2$)
   Substrate: BALF-51
5. Coating: Zirconia ($ZrO_2$)
   Substrate: BK-3; TK-3; PK-1; BK-10; SK-5
6. Coating: Hafnia ($HfO_2$)
   Substrate: BAK-50; 7052 Optical; ZKN-7

In the foregoing listings, the substrate materials are given by their Shott numbers (Shott Glassworks of Mainz, Germany). As will be apparent from consideration of the materials involved, a certain amount of leaway in thermal coefficient of expansion will be permitted since the metal-to-glass substrate contact can be chosen independently of the metal-to-tube seal, the latter being highly restricted but the former being more liberal because of the interposed metal-to-metal seal between the metal parts themselves.

After cooling, the tube is evacuated, filled with the appropriate gas at the required pressure, and adjusted for accurate alignment of the mirrors.

Figure 7:
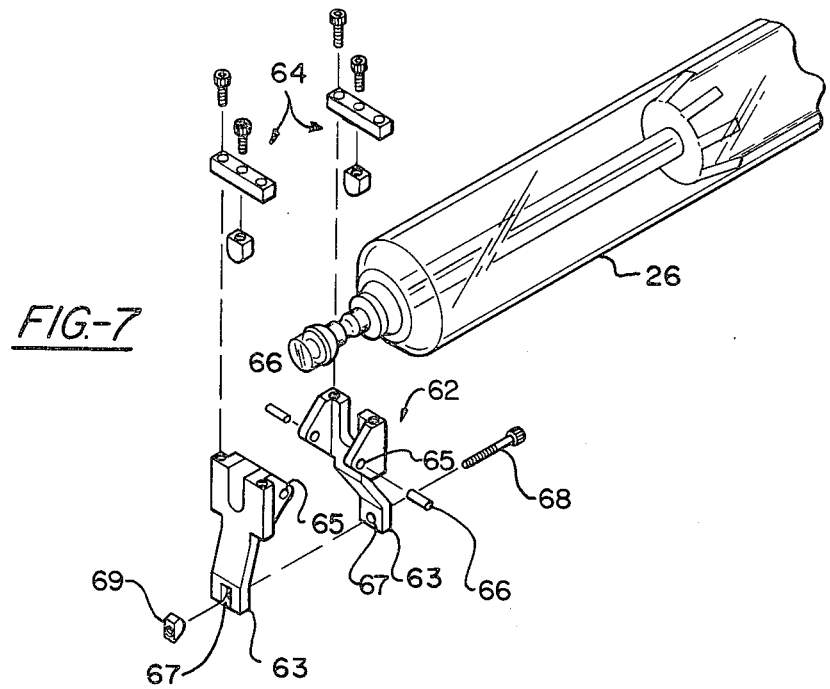
FIG. 7 is an exploded view in perspective of the anode end of the assembled plasma tube of FIG. 1, showing the clamping components for obtaining approximate adjustment of the anode end mirror.
Figure 8:
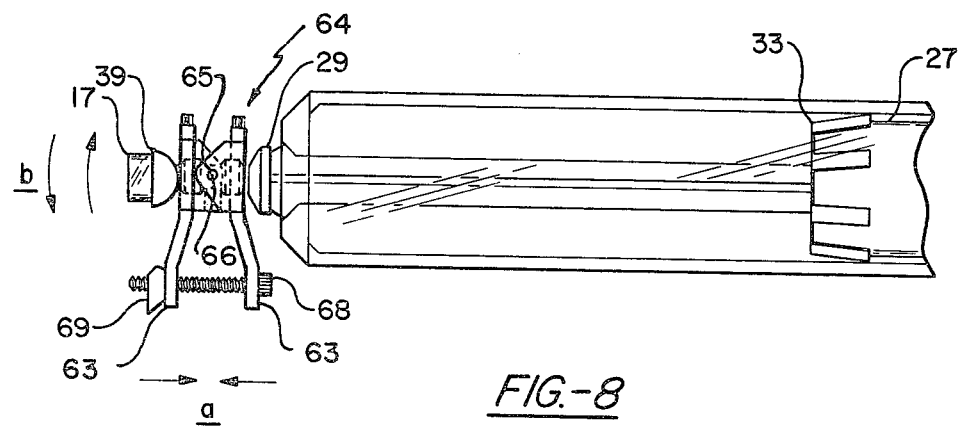
FIG. 8 is an elevational view of the plasma tube of FIG. 7, showing the same with clamping components assembled in position for adjustment.

As shown in FIGS. 7 and 8, adjustment of the anode end assembly 29, 38, and 39 of the finished hard-sealed, gas-filled plasma tube is achieved by placing the same into a specially designed bending tool 62 which is formed by a pair of interlocking handles 63. Thus, the anode assembly is placed in a yoke in each half of the handle portions of the tube and clamped therein by close fitting caps 64. The yoke-cap system is a snug fit into the cylindrical portions of the bendable tube 38 at each end thereof, which fit prevents co-arctation of the tube when it is bent. Positioned midway between the two yokes and fitting into the middle of the central radially reduced portion 38a of the bendable tube is an anvil having a cross-section transversely of less than that found in the fully bent tube and in longitudinal section is yoke-shaped with a radius twice that of the reduced portion of the bendable tube. This anvil serves to focus the break of the bendable tube when the yokes are mis-aligned during adjustment. This mis-alignment is accomplished by forcing the handles of the bending tool closer together, which in turn causes the yokes to move around the fulcrum pins 66 provided in overlapping portions of the handles. Exact control of the amount of force applied to the handles is accomplished through a screw action, i.e. screw 68, which spans the extremes of the handles and is screwed into a hemispherical nut 69 loosely indexed on one handle. Thus, as the screw 68 is tightened, it forces the tube to break over the anvil. Through the expediency of rotating the tube relative to the actual center line of the bending tool, the proper correction and precise alignment of the anode structure is achieved.

Figure 9:
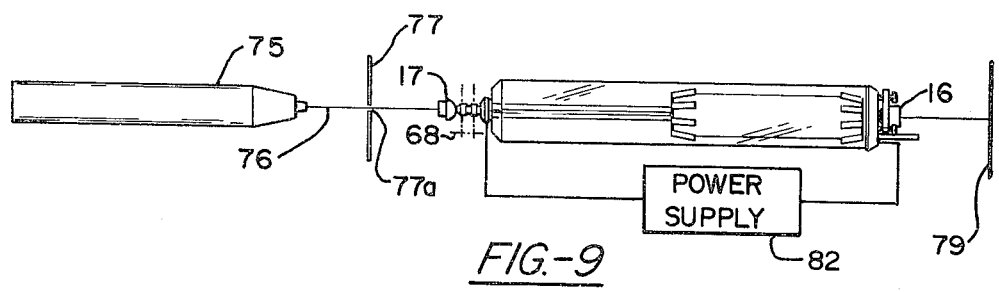
FIG. 9 is a schematic diagram illustrating the arrangement used to obtain final alignment of the plasma tube of the present invention.

The alignment of the resultant laser plasma tube constructed in accordance with the present invention is illustrated in FIG. 9. As shown, the tube is supported by suitable means (not shown) in a position to receive the output beam of an argon or other laser 75, the output frequency (i.e., $0.448\mu$) of which is selected to be sufficiently different from the frequency (i.e., HeNe at $0.632\mu$) of desired operation of the plasma tube that significant through-transmission of the beam 76 can take place. A mask 77, having a small aperture 77a therein, is disposed between the alignment laser 75 and the beam 76 into the plasma tube. A mask 79 is arranged opposite the other end of the plasma tube. The laser plasma tube is connected to a suitable power supply 82 so that, upon approximate alignment, the tube will lase. The laser plasma tube is then positioned and its bore aligned to beam 76. This is accomplished by noting approximate alignment of the input end which can be seen by movement of that end of the tube and noting a minimum in transverse scattering visible through the tube wall. The other end of the tube is moved to minimize light scattering as noted on mask 79. Mirror 17 is brought into alignment by positioning its beam reflection onto the aperture 77a in mask 77. The tube is turned around so that mirror 16 faces the mask 77. The laser is positioned once again so that the alignment beam 76 presents a spot on mask 79 with a minimum amount of scattered light. The adjustments on mirror 16 are then operated to once again reflect beam 76 back through the aperture 77a. At this point the plasma tube will lase. After the foregoing, fine tuning of the tube is accomplished using a power meter independently of the apparatus of FIG. 9, and by small adjustment of the adjustable mount for mirror 16.

It will be noted that in making inelastic deformation of the anode mirror support assembly, such inelastic deformation will always be accompanied by a final elastic partial return so that precise alignment of that member itself would require that the member be deformed byond true alignment and then allowed to elastically return to a position of alignment. Since this is difficult, final adjustment of the tube is accomplished by elastic deformation of the cathode disc 41, as will be described.

As explained, requirements for a fine alignment are met by realigning the mirror 16 and adjustment plate 48 with respect to the tube envelope 26 and against the return force of elastically deformable diaphragm 41. It will be noted that the rigid adjusting plate 48 and adjusting screws create a force bearing upon the rim of the cathode disc 41 in the region where the rim is rigidified and supported by the end of the tube envelope 26. In view of the rigid shoulder 48b which separates the adjustment plate a slight distance from the cathode diaphragm disc, it is seen that this force deforms the diaphragm disc slightly in its center due to its being of sufficiently less thickness and rigidity than the adjustment plate. In this way the axial presentation of the mirror surface of element 16 can be shifted into precise alignment with the bore of the capillary so as to maximize output from the tube. The triangular shape of the adjustment plate obviously permits the foregoing adjustments to be made in any axis and it is a matter of rather straight-forward trial and error to find which of screws 50 will maximize the output power. After this has been found, the screws can be cemented in place and the tube is ready for use.

Thus, there has been provided a method and apparatus for producing laser plasma tubes in quantities in which the laser tube can be pre-assembled in its entirety and baked in a single or multiple step operation which serves to fuse all the parts of the laser plasma tube together. For, while the present invention permits single firing or single step baking of a laser tube, there may be commercial or economic reasons for dividing the operations into a multiple step process. After initial firing of the assembled laser tube, simultaneous vacuum bake-out can be obtained by lowering the temperature to a holding level whereat the tube is vacuum tight and a vacuum drawn upon the same for the required period of time. While maintaining this vacuum, the temperature can then be slowly lowered to ambient and the tube filled to the appropriate pressure of the gaseous substance which will provide the plasma discharge for the tube. It is evident that the present invention is directly applicable to the batch processing of large quantities of laser tubes up to the limit of the size of oven available.

To those skilled in the art to which the invention pertains, many modifications and adaptations thereof will occur. For example, it is evident that the present invention supplies a method and a general system for the production of plasma laser tubes which is immediately applicable to the production of a plurality of such tubes simultaneously either by batch process or by continuous baking processes. Accordingly, whenever, in the following claims, the recitation is made of the production of or apparatus for or the product resulting from the manufacture of a single tube, it should be understood that the same is intended to cover the production of a plurality of tubes as well.

In addition, while one specific structure is given as an example of inelastic and elastic deformations of the components at the end of the laser tube, it should be understood that other structures which are equivalent may be included within the scope of those claims not limited to the specific structures disclosed.

We claim:

1. In a method for the production of laser tubes comprising an assembly of components including an elongated glass plasma envelope, a cathode assembly, a capillary structure, optical end elements, metal cathode and anode end assemblies for receiving said optical elements and adapted to be joined to said elongated glass plasma envelope, at least one of said metal cathode and anode end assemblies being deformable for aligning said optical elements to define a laser optical cavity and bonding material interposed between said components for bonding said components to one another to seal the laser tube, the steps of coating the abutting surfaces of said components with said bonding material, placing said cathode assembly in said elongated glass plasma envelope, supporting said metal cathode end assembly, seating one end of said elongated glass plasma envelope on one side of said metal cathode end assembly to be supported thereby, placing one of said optical elements against the other side of said metal cathode end assembly, introducing said capillary structure in said elongated glass plasma envelope to be supported within said envelope by the other end of said envelope, seating the metal anode end assembly on said capillary structure, placing the other optical element on said metal anode end assembly, applying an axial force to said assembled components to force them together, heating the assembled parts to cause the bonding material to bond the adjacent surfaces to one another to form the sealed laser envelope, cooling the assembled laser envelope and aligning the optical elements by deforming at least one of said metal end elements.

2. A method as in claim 1 wherein said axial force applied to said assembled components includes a force independently applied to the optical end element associated with the metal cathode end assembly.

3. A method as in claim 1 in which said components include a capillary defining bore through said laser tube and further including the steps of establishing a discharge radiation field within said tube, and adjusting at least one of said deformable means to bring said associated optical elements into an aligned relationship with said bore.

4. A method as in claim 1 in which said laser tube assembly is provided with vacuum evacuating means prior to being heated and further including the step of drawing a vacuum upon said tube during a portion of its cooling cycle to thereby simultaneously heat the laser tube and evacuate the same.

5. A method as in claim 4 further including the step of filling said tube to the appropriate pressure with a plasma forming substance subsequent to evacuation thereof and during said cooling cycle.

6. A method as in claim 5 in which said components include a capillary defining a bore through said tube and in which said optical end elements are mirrors, and further including the steps of establishing a radiation field within said tube, after evacuation, filling, and cooling, by passing a beam through said capillary and in alignment therewith, adjusting one of said end mirrors into alignment with said beam, creating a plasma discharge with the plasma in said tube to create an internal radiation field, adjusting the other end mirror into alignment with said internal radiation field.

7. A method as in claim 1 in which said components include a capillary defining a plasma discharge bore through said tube, a second member for adjusting the other end element of said tube when completed, the first of said members being inelastically deformable, the second member being elastically deformable, and further including the steps of creating a radiation field with said tube and through said bore, adjusting said first member to align the associated end element with the radiation field and said bore, then adjusting the second member to align its associated element with said radiation field.

8. A method for constructing a bakable laser tube from a plurality of components including a cylindrical glass envelope coaxially housing a cylindrical metal cathode, a cathode end assembly having conductive components electrically connected to said cathode, said cathode assembly being fusable to said glass envelope in sealing engagement therewith, a metal anode end assembly having conductive components, said cathode and anode end assemblies including optical elements for closing the ends thereof, a glass capillary having a bore therethrough, and optical element seats formed at the end of said cathode end assembly and the end of said anode end assembly, respectively, comprising the steps of depositing a coating of pre-glaze material on predetermined surfaces of each of said components, placing said cathode end assembly into said glass envelope together with said cathode optical element, aligning said glass envelope and cathode assembly in a vertical direction by application of lateral adjustment means disposed in a jig, inserting said capillary into said glass envelope through the open end thereof, placing said anode end assembly over said capillary and envelope at its end remote from said cathode support and in coaxial alignment therewith, compressing said vertically mounted assembly of components, and baking the same to form a unitary laser plasma tube in which all parts are hard-sealed together and thereafter cooling said hard-sealed tube to ambient temperature.

9. A method as in claim 8 wherein said baking consists of gradually raising the temperature over a period of 45 minutes from ambient to 480° C. and said cooling consists in reducing said temperature from 480° C. to ambient over a period of two hours.

10. The method as in claim 8 further including providing a filling tube to an aperture formed in a portion of said cathode end assembly and the step of evacuating and filling said tube during the baking cycle.

11. The method as in claim 10 wherein said cooling consists in reducing said temperature from 480° C. to a temperature in the range of 325°–400° C. and wherein said evacuation proceeds while said assembly is held in said temperature range.

* * * * *